United States Patent
Zhang et al.

(10) Patent No.: US 6,611,786 B1
(45) Date of Patent: Aug. 26, 2003

(54) APPARATUS AND METHOD CONCERNING ANALYSIS AND GENERATION OF PART PROGRAM FOR MEASURING COORDINATES AND SURFACE PROPERTIES

(75) Inventors: Yuwu Zhang, Kawasaki (JP); Masayoshi Uneme, Yamatokoriyama (JP); Yasushi Fukaya, Niwa-gun (JP); Kazuo Yamazaki, 1500 7th St. #7-0, Sacramento, CA (US) 95814

(73) Assignees: Mitutoyo Corporation, Kawasaki (JP); Mori Seiki Co., Ltd., Yamatokoriyoma (JP); Okuma Corporation, Nagoya (JP); Kazuo Yamazaki, Sacramento, CA (US)

( * ) Notice: Subject to any disclaimer, the term of this patent is extended or adjusted under 35 U.S.C. 154(b) by 0 days.

(21) Appl. No.: 09/529,805

(22) PCT Filed: Aug. 28, 1998

(86) PCT No.: PCT/JP98/03837

§ 371 (c)(1),
(2), (4) Date: Apr. 20, 2000

(87) PCT Pub. No.: WO00/12964

PCT Pub. Date: Mar. 9, 2000

(51) Int. Cl.$^7$ ............................ G06F 19/00; G06F 15/00
(52) U.S. Cl. .................................. 702/156; 33/505
(58) Field of Search .......................... 702/156, 150, 702/151, 152, 153, 167, 168; 33/503, 504, 505

(56) References Cited

U.S. PATENT DOCUMENTS

| | | | | |
|---|---|---|---|---|
| 4,918,627 A | * | 4/1990 | Garcia et al. | 348/92 |
| 4,991,304 A | * | 2/1991 | McMurtry | 33/505 |
| 5,198,990 A | * | 3/1993 | Farzan et al. | 700/195 |
| 5,390,128 A | * | 2/1995 | Ryan et al. | 318/568.23 |
| 5,737,218 A | * | 4/1998 | Demotte et al. | 364/191 |
| 5,829,151 A | * | 11/1998 | Collier et al. | 33/1 M |
| 5,917,726 A | * | 6/1999 | Pryor | 29/712 |
| 5,970,431 A | * | 10/1999 | He | 700/160 |
| 6,012,022 A | * | 1/2000 | Michiwaki | 345/420 |
| 6,366,831 B1 | * | 4/2002 | Raab | 33/503 |
| 2002/0032541 A1 | * | 3/2002 | Raab et al. | 702/152 |

FOREIGN PATENT DOCUMENTS

EP      0 665 481 A2      8/1995

OTHER PUBLICATIONS

Pearsall et al., "Dynamic Manufacturing Process Control", IEEE, 1994.*

* cited by examiner

*Primary Examiner*—Patrick Assouad
(74) *Attorney, Agent, or Firm*—Oliff & Berridge, PLC

(57) ABSTRACT

In coordinate and surface texture measurement in which measurement control is performed by a part program, a part program is analyzed to extract measurement information or measurement condition. The measurement condition is rewritably stored such that optimal measurement conditions of an actual measurement can be reflected in a part program, and such that the actual measurement conditions can be added to subsequent measurement control.

14 Claims, 21 Drawing Sheets

Fig. 4

MEASUREMENT DEVICE DATA (BASIC CONDITION DATABASE)

| NU-MER-AL | TYPE | MEASURING RANGE | | | MINIMUM DISPLAY AMOUNT | MEASUREMENT ACCURACY | | DRIVE SPEED | | | MOUNTABLE PROBE | MOUNTABLE TABLE |
|---|---|---|---|---|---|---|---|---|---|---|---|---|
| | | X | Y | Z | | U1 | U3 | X | Y | Z | | |
| m1 | H | 1000 | 1000 | 500 | 1 | 1 | 1.5 | 5000 | 5000 | 2000 | p1, p2 | b1 |
| m2 | | | | | | | | | | | | |

Fig. 5

MEASURING TABLE DATA (BASIC CONDITION DATABASE)

| NU-MER-AL | TYPE | MEASURING RANGE | | MINIMUM MOVEMENT AMOUNT | DRIVE SPEED | | LABEL |
|---|---|---|---|---|---|---|---|
| | | X | Y | | X | Y | |
| b1 | C | 100 | 100 | 1 | 500 | 500 | |
| b2 | | | | | | | |

Fig. 6

PROBE DATA (BASIC CONDITION DATABASE)

| NU-MER-AL | TYPE | CONTACTING PORTION COORDINATES | | | CONTACT-ING PORTION SHAPE | CONTACT-ING PORTION DIAMETER | OVER-TRAVEL AMOUNT | MEASURE-MENT DIRECTION | MEASURE-MENT ACCURACY | MEASURING SPEED | | LABEL |
|---|---|---|---|---|---|---|---|---|---|---|---|---|
| | | X | Y | Z | | | | | | MINIMUM | MAXIMUM | |
| p1 | FIXED | 0 | 0 | -50 | R | 3 | 5 | ±x,±y,-z | 1 | 3 | 50 | |
| p2 | | | | | | | | | | | | |

Fig. 7

TOLERANCE DATA (BASIC CONDITION DATABASE)

| NU-MER-AL | TYPE | TOLERANCE | | LABEL |
|---|---|---|---|---|
| | | LOWER LIMIT | UPPER LIMIT | |
| t1 | DIAM | -5 | 5 | |
| t2 | | | | |

Fig. 8

MEASUREMENT CONDITION DATABASE

| NU-MER-AL | MEA-SURE-MENT DEVICE | MEASUR-ING TABLE | PROBE | TOLER-ANCE | GEOMETRIC MODEL | MEASUR-ING REGION | GEOMETRIC MODEL ORIENTATION | GEOMETRIC MODEL SIZE | NUMBER OF MEASURING POINTS | MEASUR-ING SPEED | POSITION-ING SPEED | LABEL |
|---|---|---|---|---|---|---|---|---|---|---|---|---|
| r1 | m1 | no | p1 | t1 | CIRCLE | INNER | -1.0z | 100r | 4 | 10 | 1000 | |
| r2 | | | | | | | | | | | | |

Fig. 11A

PROGRAM EXAMPLE

| No. | PROGRAM | NOTE |
|---|---|---|
| 1 | DMISMN/'EXAMPLE_PROG1' | PROGRAM NAME |
| 2 | FILNAM/'PROG_1' | NAME OF THE FILE CONTAINING THE PROGRAM |
| 3 | WKPLAN/XYPLAN | THE X-AXIS AND Y-AXIS OF THE COORDINATE SYSTEM MATCH THE X-AXIS AND Y-AXIS (IN THE YZ PLANE, Y-AXIS BECOMES THE X-AXIS.) |
| 4 | UNITS/MM, ANGDEC | INPUT UNIT IS MM. ANGLE IS INPUT BY DEGREES. |
| 5 | DECL/GLOBAL, REAL, X | |
| 6 | DECL/GLOBAL, REAL, Y | |
| 7 | DECL/GLOBAL, REAL, Z | X, Y, AND Z ARE DECLARED TO BE VARIABLES OF REAL NUMBERS. |
| 8 | M (ANY_CIRCLE)=MACRO/X1, Y1, Z1, R1, "ANYCR" | A MACRO IS DEFINED. |
| 9 | X=ASSIGN/2*R1 | |
| 10 | F (ANYCR)=FEAT/CIRCLE, CART, X1, Y1, Z1, .0, .0, -1.0, X | A CIRCLE IS DEFINED (DEFINITION OF THE NOMINAL VALUE). |
| 11 | MEAS/CIRCLE, F (ANYCL), 4 | MEASURE FOUR POINTS TO FORM A CIRCLE. |
| 12 | GOTO/X1, Y1, Z1 | MOVE TO X1, Y1, Z1. |
| 13 | X=ASSIGN/X1+R1-1.0 | |
| 14 | GOTO/X, Y1, Z1 | MOVE NEAR THE MEASURING POINT. |
| 15 | X=ASSIGN/X1+R1 | |
| 16 | PTMEAS/CART, X, Y1, Z1, 1.0, .0, .0 | MEASURE THE TARGET MEASURING POINT. |
| 17 | Y=ASSIGN/Y1+R1-1.0 | |
| 18 | GOTO/X1, Y, Z1 | MOVE NEAR THE NEXT MEASURING POINT. |
| 19 | Y=ASSIGN/Y1+R1 | |
| 20 | PTMEAS/CART, X1, Y, Z1, .0, 1.0, .0 | MEASURE THE TARGET MEASURING POINT. |
| 21 | X=ASSIGN/X1-R1+1.0 | |
| 22 | GOTO/X, Y1, Z1 | |
| 23 | X=ASSIGN/X1-R1 | |
| 24 | PTMEAS/CART, X, Y1, Z1, -1.0, .0, .0 | |
| 25 | Y=ASSIGN/Y1-R1+1.0 | |
| 26 | GOTO/X1, Y, Z1 | |
| 27 | Y=ASSIGN/Y1-R1 | |

Fig. 11B

| No. | PROGRAM | NOTE |
|---|---|---|
| 28 | PTMEAS/CART, X1, Y, Z1, .0, -1.0, .0 | |
| 29 | ENDMEAS | END MEASUREMENT, AS THE FOUR TARGET POINTS HAVE BEEN MEASURED. |
| 30 | ENDMACRO | END OF THE MACRO. |
| 31 | SNSET/APPRCH, .125 | HOW CLOSE TO THE MEASURING POINT TO MOVE RAPIDLY IS DETERMINED. |
| 32 | SNSET/SEARCH, .125 | HOW FAR FROM THE MEASURING POINT TO MOVE AWAY WHEN MEASURING IS DETERMINED. |
| 33 | SNSET/RETRCT, .125 | HOW MUCH TO MOVE BACK AND STOP AFTER MEASURING IS DETERMINED. |
| 34 | S (1)=SNSDEF/PROBE, INDEX, POL, 2.0, .0, .0, .0, .0, -1.0, .157 | A PROBE IS DEFINED. THE PROBE MOUNTING POSITION AND THE PROBE POSITION ARE INPUT. |
| 35 | SNSLCT/S (1) | THE DEVICE IS INFORMED THAT PROBE 1 WILL BE USED. |
| 36 | MODE/MAN | THE MEASUREMENT DEVICE IS SET IN MANUAL OPERATION. PREDETERMINED COORDINATE SYSTEMS ARE MEASURED, AND THE MEASURED SYSTEMS ARE STORED AS WORK_CS_1, WORK_CS_2. FURTHER, PROBE CALIBRATION IS PERFORMED. |
| 37 | T (1)=TOL/DIAM, -.01, .01 | FOR VERIFICATION OF THE CIRCLE DIAMETER (COMPARISON BETWEEN THE NOMINAL VALUE AND THE MEASURED VALUE), UPPER AND LOWER LIMIT TOLERANCE VALUES ARE INPUT. |
| 38 | DISPLAY/PRINT, DMIS, TERM, DMIS, STOR, DMIS | THE OUTPUT IS MADE TO THE PRINTER, CRT, AND FILE IN A DMIS FORMAT. |
| 39 | FILNAM/'PROG1_OUT' | NAME OF THE OUTPUT FILE |
| 40 | PRCOMP/ON | CORRECT VALUE IS CALCULATED USING COMPENSATED PROBE DIAMETER. |
| 41 | FEDRAT/POSVEL, PCENT, .75 | MOVEMENT SPEED IS SET. |
| 42 | FEDRAT/MESVEL, PCENT, .5 | MEASURING SPEED IS SET. |
| 43 | $$ IS THE SYMBOL FOR COMMENTS. | |
| 44 | RECALL/D (WORK_CS_1) | RETRIEVE COORDINATE SYSTEM 1. |
| 45 | M (ANY_SLOT)=MACRO/X1, Y1, Z1, L, R1, "ANYSLOT_CR1", "ANYSLOT_CR2", & "1P0", "2P0", "3P0", "4P0" | A MACRO IS DEFINED. |

Fig. 11C

| No. | PROGRAM | NOTE |
|---|---|---|
| 46 | X=ASSIGN/X1+L/2 | |
| 47 | Y=ASSIGN/2*R1 | |
| 48 | F (ANYSLOT_CR1)=FEAT/ CIRCLE, CART, X, Y1, Z1, .0, .0, -1.0, Y | |
| 49 | X=ASSIGN/X1-L/2 | |
| 50 | F (ANYSLOT_CR2)=FEAT/ CIRCLE, CART, X, Y1, Z1, .0, .0, -1.0, Y | A CIRCLE IS DEFINED (DEFINITION OF THE NOMINAL VALUE). |
| 51 | MEAS/CIRCLE, F (ANYSLOT_CR 1), 3 | MEASURE THREE POINTS TO FORM A CIRCLE. |
| 52 | GOTO/X1, Y1, Z1 | MOVE TO X1, Y1, Z1. |
| 53 | X=ASSIGN/X1+L/2+R1* SIN (5) | |
| 54 | Y=ASSIGN/Y1+R1*COS (5) -0.1 | |
| 55 | GOTO/X, Y, Z1 | MOVE NEAR THE MEASURING POINT. |
| 56 | Y=ASSIGN/X1+R1*COS (5) | |
| 57 | PTMEAS/CART, X, Y1, Z1, SIN (5), COS (5), .0 | MEASURE THE TARGET MEASURING POINT. |
| 58 | X=ASSIGN/X+L/2+R1-0.1 | |
| 59 | GOTO/X, Y1, Z1 | |
| 60 | X=ASSIGN/X+L/2+R1 | |
| 61 | PTMEAS/CART, X, Y1, Z1, 1.0, 0.0, .0 | MEASURE THE TARGET MEASURING POINT. MOVE NEAR THE NEXT MEASURING POINT. |
| 62 | X=ASSIGN/X+L/2+R1*SIN (5) | |
| 63 | Y=ASSIGN/X1-R1*COS (5) +0.1 | |
| 64 | GOTO/X, Y, Z1 | |
| 65 | Y=ASSIGN/X1-R1*COS (5) | |
| 66 | PTMEAS/CART, X, Y, Z1, SIN (5), -COS (5), .0 | |
| 67 | ENDMEAS | |

Fig. 11D

| No. | PROGRAM | NOTE |
|---|---|---|
| 68 | X=ASSIGN/X1+0.9*L/2 | |
| 69 | Y=ASSIGN/Y1+R1-0.1 | |
| 70 | GOTO/X, Y, Z1 | |
| 71 | Y=ASSIGN/Y1+R1 | |
| 72 | F (1PO)=FEAT/POINT, CART, X, Y, Z1, .0, 1.0, .0 | |
| 73 | MEAS/POINT, F (1PO), 1 | |
| 74 | PTMEAS/CART, X, Y, Z1, .0, 1.0, .0 | |
| 75 | ENDMEAS | |
| 76 | X=ASSIGN/X1+0.9*L/2 | |
| 77 | Y=ASSIGN/Y1-R1+0.1 | |
| 78 | GOTO/X, Y, Z1 | |
| 79 | Y=ASSIGN/Y1-R1 | |
| 80 | F (2PO)=FEAT/POINT, CART, X, Y, Z1, .0, -1.0, .0 | |
| 81 | MEAS/POINT, F (2PO), 1 | |
| 82 | PTMEAS/CART, X, Y, Z1, .0, -1.0, .0 | |
| 83 | ENDMEAS | |
| 84 | X=ASSIGN/X1-0.9*L/2 | |
| 85 | Y=ASSIGN/Y1-R1+0.1 | |
| 86 | GOTO/X, Y, Z1 | |
| 87 | Y=ASSIGN/Y1-R1 | |
| 88 | F (3PO)=FEAT/POINT, CART, X, Y, Z1, .0, -1.0, .0 | |
| 89 | MEAS/POINT, F (3PO), 1 | |
| 90 | PTMEAS/CART, X, Y, Z1, .0, -1.0, .0 | |
| 91 | ENDMEAS | |
| 92 | Y=ASSIGN/Y1+R1-0.1 | |
| 93 | GOTO/X, Y, Z1 | |
| 94 | Y=ASSIGN/Y1+Rl | |

Fig. 11E

| No. | PROGRAM | NOTE |
|---|---|---|
| 95 | F (4PO)=FEAT/POINT, CART, X, Y, Z1, .0, 1.0, .0 | |
| 96 | MEAS/POINT, F (4PO), 1 | |
| 97 | PTMEAS/CART, X, Y, Z1, .0, 1.0, .0 | |
| 98 | ENDMEAS | |
| 99 | MEAS/CIRCLE, F (ANYSLOT_CR 2), 3 | MEASURE THREE POINTS TO FORM A CIRCLE. |
| 100 | GOTO/X1, Y1, Z1 | MOVE TO X1, Y1, Z1. |
| 101 | X=ASSIGN/X1-L/2+R1∗SIN (5) | |
| 102 | Y=ASSIGN/Y1+R1∗COS (5) -0.1 | |
| 103 | GOTO/X, Y, Z1 | MOVE NEAR THE MEASURING POINT. |
| 104 | Y=ASSIGN/X1+R1∗COS (5) | |
| 105 | PTMEAS/CART, X, Y1, Z1, SIN (5), COS (5), .0 | MEASURE THE TARGET MEASURING POINT. |
| 106 | X=ASSIGN/X-L/2+R1-0.1 | |
| 107 | GOTO/X, Y1, Z1 | |
| 108 | X=ASSIGN/X-L/2+R1 | |
| 109 | PTMEAS/CART, X, Y1, Z1, 1.0, 0.0, .0 | MEASURE THE TARGET MEASURING POINT. MOVE NEAR THE NEXT MEASURING POINT. |
| 110 | X=ASSIGN/X-L/2+R1∗SIN (5) | |
| 111 | Y=ASSIGN/X1+R1∗COS (5) +0.1 | |
| 112 | GOTO/X, Y, Z1 | |
| 113 | Y=ASSIGN/X1-R1∗COS (5) | |
| 114 | PTMEAS/CART, X, Y, Z1, SIN (5), -COS (5), .0 | |
| 115 | ENDMEAS | |
| 116 | GOTO/.0, .0, 5.0 | |
| 117 | ENDMACRO | |
| 118 | GOT0/70.0, -50.0, 5.0 | TO MEASURE THE FOUR CIRCLES, MOVE TO A POSITION ABOVE THE FIRST CIRCLE. |

Fig. 11F

| No. | PROGRAM | NOTE |
|---|---|---|
| 119 | CALL/M (ANY_CIRCLE), 70.0, -50.0, -12.5, (1CR), 10 | DEFINE AND MEASURE THE FIRST CIRCLE. INPUT THE RESULT IN FA (1CR). |
| 120 | GOTO/70.0, -50.0, 5.0 | MOVE TO A POSITION ABOVE THE FIRST CIRCLE. |
| 121 | GOTO/70.0, 50.0, 5.0 | |
| 122 | CALL/M (ANY_CIRCLE), 70.0, 50.0, -12.5, (2CR), 10 | DEFINE AND MEASURE THE SECOND CIRCLE. INPUT THE RESULT IN FA (1CR). |
| 123 | GOTO/70.0, 50.0, 5.0 | |
| 124 | GOTO/-70.0, 50.0, 5.0 | |
| 125 | CALL/M (ANY_CIRCLE), -70.0, 50.0, -12.5, (3CR) | |
| 126 | GOTO/-70.0, 50.0, 5.0 | |
| 127 | GOTO/-70.0, 50.0, 5.0 | |
| 128 | CALL/M (ANY_CIRCLE), -70.0, -50.0, -12.5, (4CR) | |
| 129 | GOTO/-70.0, -50.0, 5.0 | |
| 130 | CALL/M (ANY_SLOT), .0, .0, .0, 60.0, 20.0, "ANYSLOT_CR1", "ANYSLOT_CR2", & "1PO", "2PO", "3PO", "4PO" | MEASURE THE SLOT. |
| 131 | RECALL/D (WORK_CS_2) | TO MEASURE THE SIDE, RETRIEVE THE PRESET COORDINATE SYSTEM 2. |
| 132 | GOTO/.0, 40.0, 5.0 | |
| 133 | CALL/M (ANY_CIRCLE), .0, 40.0, -10.0, (51CR) | DEFINE AND MEASURE FIRST OF THE TWO CIRCLES. |
| 134 | GOTO/.0, 40.0, 5.0 | |
| 135 | GOTO/.0, -40.0, 5.0 | |
| 136 | CALL/M (ANY_CIRCLE), .0, -40.0, -10.0, (52CR) | |
| 137 | GOTO/.0, -40.0, 5.0 | |
| 138 | EVAL/FA (1CR), FA (2CR), FA (3CR), FA (4CR), T (1) | VERIFY THE DIAMETERS OF THE FOUR INITIALLY MEASURED CIRCLES. |
| 139 | OUTPUT/F(1CR), F (2CR), F (3CR), F (4CR), T (1) | OUTPUT THE NOMINAL VALUE AND THE TOLERANCE OF THE FOUR CIRCLES. |
| 140 | OUTPUT/FA (1CR), FA (2CR), FA (3CR), FA (4CR), TA (1) | OUTPUT THE MEASURED VALUES AND THE VERIFICATION RESULTS OF THE FOUR CIRCLES. |
| 141 | ENDFIL | END OF PROGRAM. |

APPARATUS AND METHOD CONCERNING ANALYSIS AND GENERATION OF PART PROGRAM FOR MEASURING COORDINATES AND SURFACE PROPERTIES

TECHNICAL FIELD

The present invention relates to analysis and creation of part programs used in coordinate and surface texture measurement. The present invention more particularly relates to a part program analysis method and apparatus and a part program creation method and apparatus, in which various measurement information or measurement conditions are extracted from a part program used for actual measurement, and the extracted information is stored as general-purpose information for constructive use in an associated coordinate and surface texture measurement device or other three-dimensional coordinate measurement devices.

BACKGROUND ART

Three-dimensional coordinate measurement devices and surface texture measurement devices are measurement devices for measuring and evaluating, primarily, the dimensions and the shape of a workpiece. However, by replacing the measurement probe, those devices can be used to simultaneously measure and evaluate the surface roughness of a workpiece. Three-dimensional coordinate measurement devices are employed in a wide range of industrial fields because many types of measurement probes such as a touch-trigger sensor, camera, or laser sensor can be used with such devices.

The operation of a three-dimensional coordinate measurement device and surface texture measurement device is defined by information written in a measurement part program. In a computer numerical control (CNC) three-dimensional coordinate measurement device, the operation is automatically controlled according to an input part program.

Typically, a part program integrates commands concerning measurement operation such as a probe change command and a measurement command, and commands concerning measurement device control such as a positioning speed command and a measuring speed command. In order to precisely and efficiently perform a measurement operation, the part program must include commands appropriate for both the workpiece, i.e., the object of measurement, and the measurement device, i.e., the object of control.

Conventionally, methods for creating a measurement part program include online teaching, in which an operator controls the three-dimensional coordinate measurement device using an operation panel to teach measurement procedures, and offline teaching, in which electronic diagram information such as CAD data of the workpiece is used to teach the measurement procedures without moving the actual three-dimensional coordinate measurement device. Compared to online teaching by an operator, offline teaching through CAD data is especially useful when performing in-line measurement because the measurement device need not be tied up while a measurement part program is created.

Normally, in online teaching, the operator can easily determine the positions and items of measurement based on the workpiece diagrams and the measurement operation instructions. However, the operator usually determines the specific measurement procedures, such as the selection of measurement probe, setting of measuring speed, and number of points to use for measuring each item, based on his or her skill and experience. An operator with less skill and experience must therefore repeatedly modify and test a part program before completing a high-quality part program.

In offline teaching, on the other hand, the offline programming tool creates a measurement part program using input data such as the workpiece diagram data and the measurement operation instruction data, and the integrated databases inside the programming tool such as a database on the specification of the measurement device and a database on measurement conditions and methods. The raw part program created in this way is, in general, far from being an optimal part program. In order to complete a high-quality part program, it is necessary to optimize the measurement path and the measurement procedures such as the selection of measurement probe, setting of measuring speed, and number of measuring points. Accordingly, it is necessary to repetitively perform the processes of conducting simulations and test measurements, and of modifying the part program according to the measurement results.

As explained above, in conventional methods for creating a part program for three-dimensional coordinate measurement, whether it be online teaching by an operator or offline teaching using CAD data, there is a problem that test measurements and part program modifications must be repeated to create a high-quality part program. Further, while the knowledge and know-how concerning measurement procedures obtained through the above-described processes for completing a high-quality part program can improve the skill and experience of a single operator, it is a significant problem that this knowledge and know-how can not readily be shared by a group of people.

The present invention was conceived in light of the existing problems. The object of the present invention is to analyze a measurement part program, especially a practiced measurement part program used after completion of modification and tests, and to extract measurement information or measurement conditions which reflect the operator's skills, experience, and know-how, such that the extracted information can be used as a database for subsequent measurements. By systematically correlating this extracted measurement information or measurement conditions to information such as probe information, measurement device information, workpiece material information, and machining method information, commands appropriate for both the workpiece, i.e., the object of measurement, and the measurement device, i.e., the object of control, can be integrated in a part program from the initial stages of the part program creation. By referencing the accumulated database obtained as feedback, a measurement part program optimal for each case can be instantly and automatically programmed. Furthermore, such a database can also supply data for measurement devices other than the original measurement device. The database can be shared among all the measurement devices which are the members constituting a CIM (computer integrated manufacturing system). Much of the program modification and editing can thereby be performed based on interactions with the database, without completely depending on operator skill.

DISCLOSURE OF THE INVENTION

The present invention was created in view of the above objects. In coordinate and surface texture measurement in which measurement control is performed by a part program, the present invention comprises a measurement method analyzing means or step for analyzing a part program to extract measurement information or measurement condition, and a storing means or step for rewritably storing said measurement condition.

Further, in coordinate and surface texture measurement in which measurement control is performed by a part program, the present invention may comprise a measurement method analyzing means or step for analyzing a part program to extract measurement information or measurement condition for each item measurement, and a storing means or step for rewritably storing said measurement condition corresponding to each item measurement.

Still further, in coordinate and surface texture measurement in which measurement control is performed by a part program, the present invention may comprise a measurement method analyzing means or step for receiving an input of a measurement part program and workpiece machining information data, and for analyzing said practiced measurement part program to extract measurement information or measurement condition for each item measurement; a database producing means or step for converting said measurement information or measurement condition extracted for each item measurement into a database necessary for creating a part program; and a database for creating a part program, which rewritably stores said measurement condition corresponding to each item measurement.

In the present invention, the database may be a relational database.

According to the present invention, a part program for coordinate and surface texture measurement may be created referring to the database.

Moreover, an apparatus for generating a part program for coordinate and surface texture measurement according to the present invention may analyze data of the database for use in determining of a measurement condition, and output or display the result of the analysis.

Furthermore, an apparatus for generating a part program for coordinate and surface texture measurement according to the present invention may analyze data of the database to automatically determine a measurement condition.

As described above, in a three-dimensional coordinate measurement system according to the present invention, the measurement method of a completed part program used for actual measurement in work sites can be analyzed to extract necessary measurement conditions, and the extracted conditions can be reflected in the database used when creating a part program. It is therefore possible to reliably extract measurement conditions, including know-how of skilled operators and modifications of part programs achieved only through simulations or test measurements, and to produce a database with those extracted conditions. In this way, a knowledge database which is extremely useful for database creation can be easily configured.

According to the present invention, the measurement conditions extracted from part programs created for each necessary measurement are accumulated while being systematically correlated to probe information, measurement device information, workpiece material information, workpiece machining information, and the like. In this way, the measurement conditions can be integrated into the database in a manner that takes advantage of the accumulated skill, experience, and know-how of individual operators.

With this arrangement, commands appropriate to both the workpiece, i.e., the object of measurement, and to the measurement device, i.e., the object of control, can be integrated in a part program from the initial stages of the part program is creation. By referencing the accumulated database obtained as a feedback, an optimal measurement part program for each case can be instantly and automatically programmed. Variances in measurement conditions stemming from differences among individual operators can thereby be eliminated, and measurement can be efficiently made under optimal measurement conditions. As a result, measurement accuracy can be maintained or further enhanced, and measurement time can be reduced.

Furthermore, a part program created for a particular measurement device may be adopted in another measurement device having a different specification. In such a case, by using each of the modularized measurement conditions, a new measurement part program can be automatically produced while taking into account the differences in specifications between the measurement device for which the part program was created and the new measurement device to be used. For example, the measurement condition data accumulated using an old model measurement device, except for points that have been changed, can be used as information for a new model measurement device. By inputting new information for only the changed points, automatic programming can be performed reflecting the previously accumulated data, thereby facilitating reprogramming.

BRIEF DESCRIPTION OF THE DRAWINGS

FIG. 4. shows an example of measurement device data within a basic condition database.

FIG. 5. shows an example of measuring table data within the basic condition database.

FIG. 6. shows an example of probe data within the basic condition database.

FIG. 7. shows an example of tolerance data within the basic condition database.

FIG. 8. shows an example of a measurement condition database.

FIGS. 11A, 11B, 11C, 11D, 11E, and 11F show an example part program.

BEST MODE FOR CARRYING OUT THE INVENTION

1. Description of a Conventional General System Configuration

Figure 3:
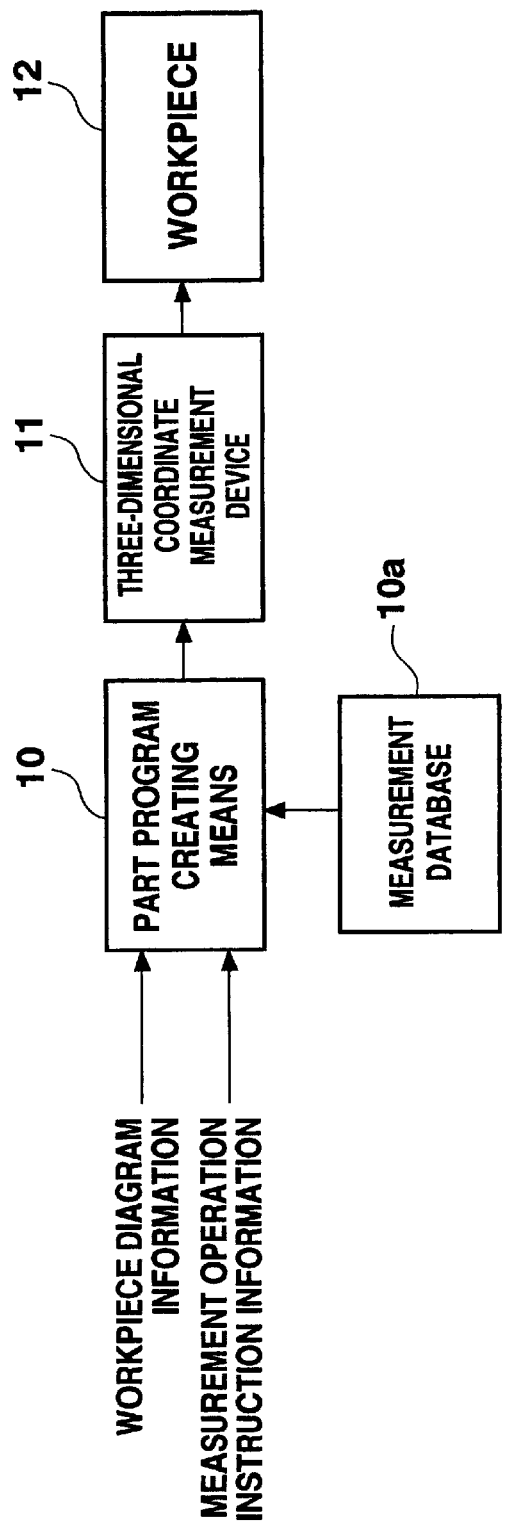
FIG. 3. shows an overall configuration of a three-dimensional coordinate measurement system adopting part program creation according to a typical three-dimensional coordinate measurement.

In general, as shown in FIG. 3, in a part program creating means 10, a part program is created based on diagram information such as the position, shape, and roughness of the workpiece, and measurement operation instruction information concerning points such as which portion of the workpiece to measure and the manner of measuring. As method for performing this part program creation, it is possible to employ methods such as the so-called online teaching in which an operator controls a three-dimensional coordinate measurement device 11 using an operation panel to teach measurement procedures, and the so-called offline teaching in which electronic diagram information such as CAD data of the workpiece 12 is used to teach the measurement procedures without moving the actual three-dimensional coordinate measurement device 11. Using either method, a part program is created while referring to a measurement database 10a including specifications of the measurement device and probe, general tolerance conditions, and measurement experience.

A created part program is subjected to test runs on the three-dimensional coordinate measurement device 11. After confirming that no problem exists, the program is used for actual measurement.

2. Description of Overall Configuration of the Present Invention

While the present invention can be implemented in surface texture measurement devices such as a surface roughness measurement device, a contour measurement device, or a roundness measurement device, the following embodiment describes the present invention in a three-dimensional coordinate measurement device.

Figure 1:
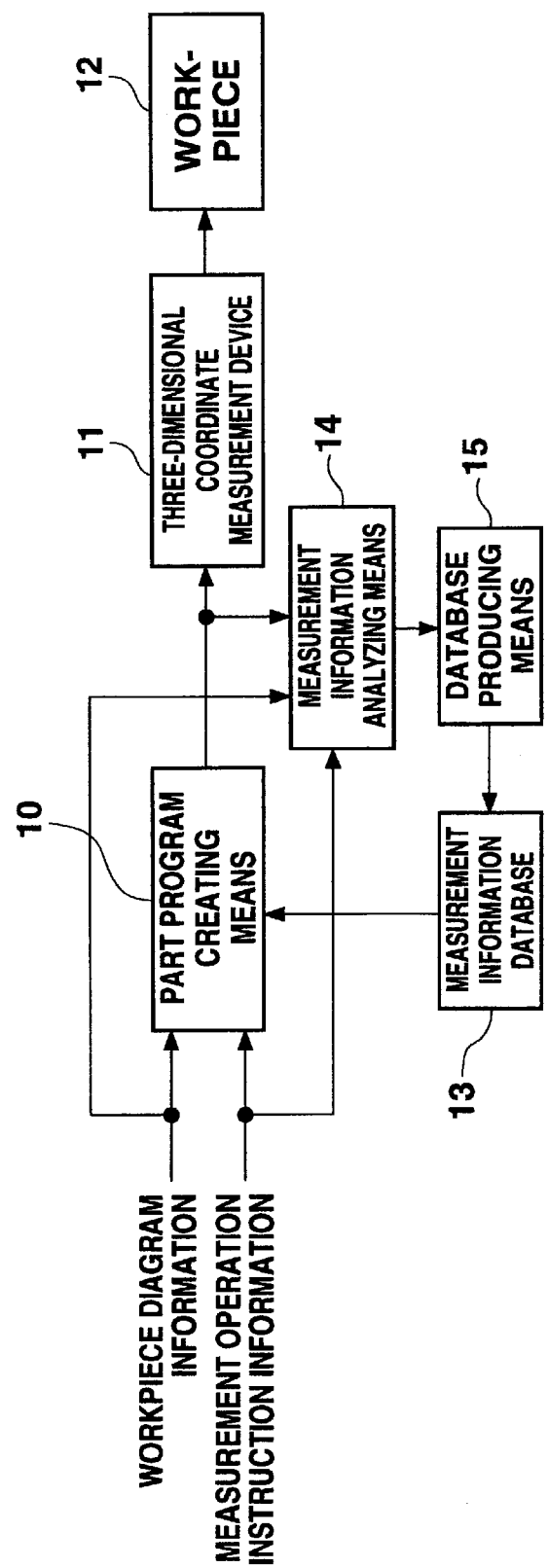
FIG. 1 shows an overall configuration of a three-dimensional coordinate measurement system adopting the part program analysis and the part program for three-dimensional coordinate measurement according to the present invention.

FIG. 1 shows an overall configuration of a preferred embodiment of a three-dimensional coordinate measurement system adopting the part program analysis method and apparatus for three-dimensional coordinate measurement according to the present invention.

In the present configuration, a part program is created while referring to the measurement information database 13, in addition to the workpiece diagram information and the measurement operation instruction information. This part program is eventually subjected to test runs on the three-dimensional coordinate measurement device 11. After confirming that no problem exists, the program is used for measurement of workpieces. Furthermore, the content of this part program is analyzed for use in updating the above-mentioned measurement information database.

The measurement information analyzing means 14 analyzes the part program to extract various information necessary for updating the database. The database producing means 15 makes additions and updates to the measurement information database 13 using the extracted information while taking into account the workpiece diagram information and the measurement operation instruction information.

3. Description of the Measurement Information Database 13

Figure 2:
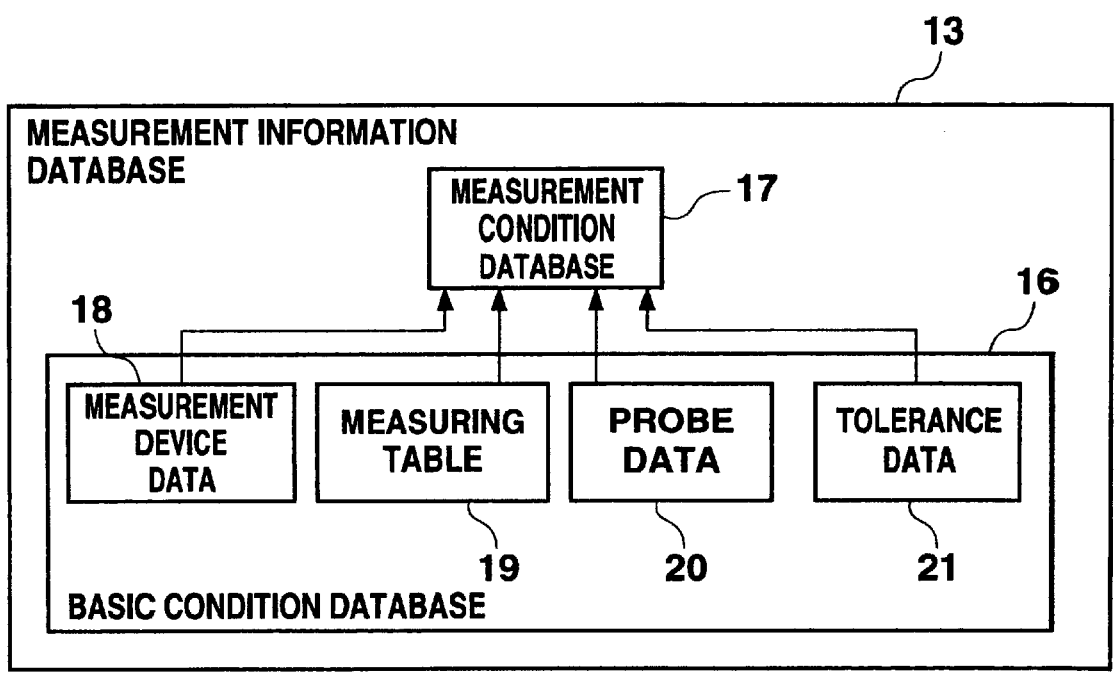
FIG. 2 shows an example overall configuration of a measurement information database.

FIG. 2 shows an embodiment of the measurement information database 13. The measurement information database 13 is composed of a basic condition database 16 and a measurement condition database 17.

The basic condition database 16 comprises measurement device data 18 indicating the specification of the measurement device itself; measuring table data 19 indicating the specification of an auxiliary component added to the measurement device, such as an X-Y table or a turntable; probe data 20 indicating the specification of the probe such as a touch-trigger sensor or a laser sensor; and tolerance data 21 storing various general tolerances and specially defined tolerances.

The measurement condition database 17 is configured based on the content of the basic condition database 16 with further addition of data such as geometric models, number of measuring points, and measuring speed.

Rather than including the actual data of the basic condition database 16 in the measurement condition database 17, the measurement condition database 17 and the basic condition data base 16 may be configured as the so-called relational databases which include information for mutual correlation.

The measurement device data 18 and probe data 20 within the basic condition database 16 may be individually configured as discrete databases.

4. Description of the Measurement Device Data 18

FIG. 4 shows an example of the measurement device data 18 within the basic condition database 16.

In an example of a three-dimensional measurement device, the measurement device data 18 stores specific data such as a data numeral which does not coincide with other data numerals; the type of the measurement device, such as moving bridge type, X-Y table type, or horizontal arm type; the measurable range of each axis; the resolution; the measurement accuracy U1 of each axis and the spatial measurement accuracy U3; the maximum drive speed for each axis; mountable and usable probes such as a touch-trigger sensor, laser sensor, or image sensor; and tables that can be mounted on the measurement device, such as X-Y tables or turntables which may be added to the measurement device as an auxiliary component.

Data for all types of measurement devices in possession can be stored in the data 18.

5. Description of the Measuring Table Data 19

FIG. 5 shows an example of the measuring table data 19 within the basic condition database 16.

In the case of an X-Y table, for example, the measuring table data 19 stores specific data such as a data numeral which does not coincide with other data numerals; type such as an orthogonal table; the measurable range of each axis; the minimum instruction unit or minimum movement amount; the maximum drive speed of each axis; and a variable label used in the part program for storing the measuring table information.

Data for all types of measuring tables in possession can be stored in the data 19.

6. Description of the Probe Data 20

FIG. 6 shows an example of the probe data 20 within the basic condition database 16.

In the case of a touch-trigger probe having a fixed type measuring portion, for example, the probe data 20 stores specific data such as a data numeral which does not coincide with other data numerals; type of the measuring portion such as fixed or indexing; the coordinates of the center of the contacting portion with respect to the probe reference position; the shape of the contacting portion indicating whether the contacting portion is spherical, disc-shaped, or other shapes; the dimension of the contacting portion, which may be the diameter when the contacting portion is spherical; the amount of over-travel possible after the contacting portion contacts the workpiece; the measuring directions in which measurements can be made; the measurement accuracy of the probe itself; the minimum and maximum speeds at which the probe can perform measurement; and a variable label used in the part program for storing the probe information.

Data for all types of probes in possession can be stored in the data 20.

7. Description of the Tolerance Data 21

FIG. 7 shows an example of the tolerance data 21 within the basic condition database 16.

General tolerances and specially defined tolerances can be registered in this table. Concerning the tolerance of a circle diameter, for example, the tolerance data 21 stores specific data such as a data numeral which does not coincide with other data numerals; type of tolerance, such as angle or diameter; the lower and upper limit values of the tolerance; and a variable label used in the part program for storing the tolerance information.

Data for all types of defined tolerances can be stored in the data 21.

8. Description of the Measurement Condition Database 17

FIG. 8 shows an example of the measurement condition database 17.

This database stores a data numeral which does not coincide with other data numerals; data for correlating to a measurement device data; data for correlating to a measuring table data; data for correlating to a probe data; data for correlating to a tolerance data; type of the geometric model, such as plane or circle; the measuring region of the geometric model, such as inside or outside; the orientation of the geometric model; the size of the geometric model, which may be a diameter when the geometric model is a circle; the number of measuring points of a particular geometric model portion of the workpiece; the measuring speed for a particular geometric model portion of the workpiece; the positioning speed for a particular geometric model portion of the workpiece; and a variable label used in the part program for storing the geometric model information.

While the data in the basic condition database 16 are updated and registered such that the data do not coincide with one another, in the measurement condition database 17, a data is assigned with a different data numeral and registered as a different data, even when all items under the database are identical with those of other data, as long as the data relates to a different measuring location on the workpiece 12.

Specifically, a data is registered as a different data as long as the data relates to a different measuring location on the same workpiece 12, even when each of the probe, tolerance, geometric model, measuring region, geometric model orientation, geometric model size, number of measuring points, measuring speed, and positioning speed are identical with those of other data.

In the above, each database and data within the database were shown and described as having a fixed format to ease understanding of the description. The format may, however, be a free format. In the probe data, for example, the specifications differ for a probe with fixed type measuring portion and a probe with indexing type measuring portion, consequently differing in types and numbers of data. In such a case, it is possible to reduce memory capacity by using a free format, although the database configuration may thereby become more complex.

9. Description of the Measurement Information Analyzing Means 14

Figure 9:
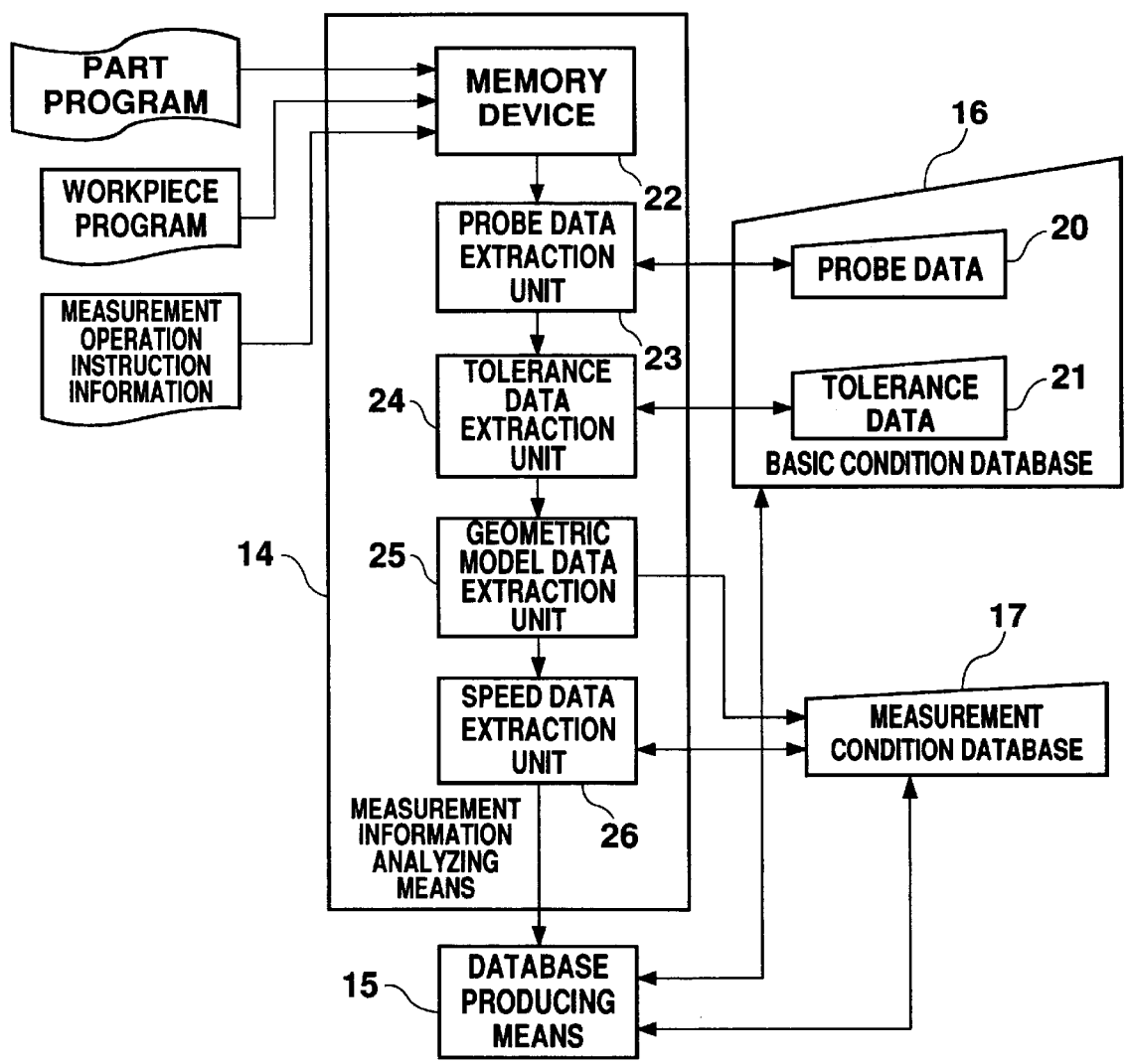
FIG. 9 shows details of a measurement information analyzing means.

FIG. 9 shows the details of the measurement information analyzing means 14.

The memory unit 22 in the figure stores the part program, the workpiece diagram information such as the surface roughness, and the measurement operation instruction information including measurement device information.

The probe data extraction unit 23 extracts data concerning probes from the part program, and conducts a search in and makes additions to the probe data in the basic condition database 16.

The tolerance data extraction unit 24 extracts data concerning tolerance from the part program, and conducts a search in and makes additions to the tolerance data 21 in the basic condition database 16.

The geometric model data extraction unit 25 extracts data concerning geometric models from the part program and adds the data to the measurement condition database 17.

The speed data extraction unit 26 extracts data concerning speed from the part program and updates the measurement condition database 17.

After the measurement information is analyzed as above, the database producing means 15 links the basic condition database 16 including the probe data 20 and the tolerance data 21 to the measurement condition database 17. Specifically, correlations are made between the databases.

10. Description of the Part Program

The flow of a specific measurement processing according to a part program will next be explained.

Figure 10:
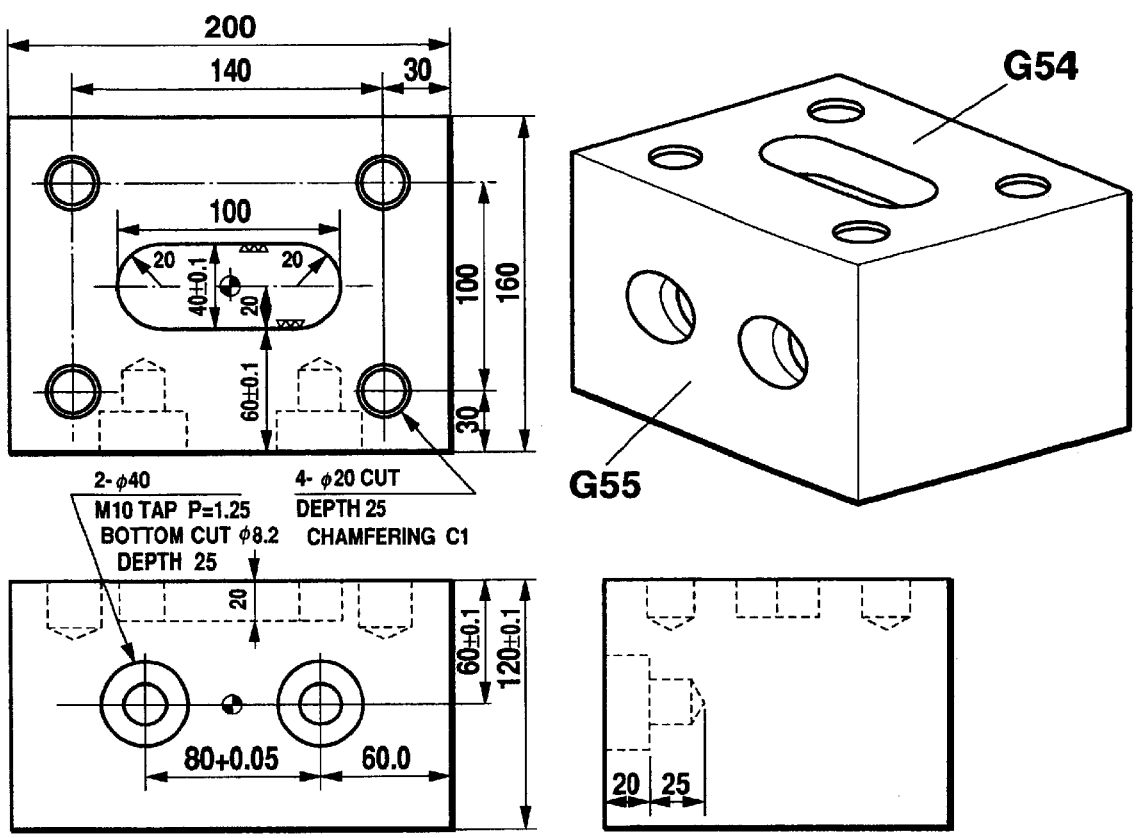
FIG. 10 shows an example workpiece.

FIG. 10 illustrates a workpiece to be measured by the part program shown in FIG. 11.

The part program measures holes in a total of six locations and a pocket in one location, which are machined in two surfaces of the workpiece.

The content of the part program is briefly explained below referring to FIGS. 11A, 11B, 11C, 11D, 11E, and 11F.

Program No. (hereinafter abbreviated as No.) 1 to No. 7 perform declaration of files and variables, so as to prepare the measurement device.

No. 8 to No. 30 define a macro for circle measurement. As indicated in No. 11, the measurement is conducted as a four-point measurement.

Probe is defined in No. 34, while a probe is selected in No. 35.

No. 37 defines tolerance.

No. 41 and No. 42 designate speed.

No. 45 to No. 117 define the macro for slot measurement. The first semicircle portion of the slot is measured by a three-point measurement in No. 51 upon assuming the semicircle to be a circle. The parallel portion constituting the slot central portion is measured by point measurement in a total of four points in No. 73, No. 81, No. 89, and No. 96, respectively. The second semicircle portion of the slot is measured by a three-point measurement in No. 99 upon assuming the semicircle to be a circle.

The actual axis movement operation for measurement starts at No. 118.

Using the circle measurement macro, circle measurement is executed in four locations in No. 119, No. 122, No. 125, and No. 128. Subsequently, slot measurement is performed in No. 130 using the macro thereof.

After switching the coordinate system in No. 131, two circles are measured by the circle measurement macro in No. 133 and No. 136.

In No. 138, tolerance verification is executed concerning the circles in the four initially measured locations.

11. Description of the Probe Data Extraction Unit 23

As shown in FIG. 9, when part program analysis is started, a part program is first read in. Subsequently, among the workpiece diagram information and the measurement operation instruction information, information that does not appear in the part program is input. This information is stored within the memory device 22.

Figure 12:
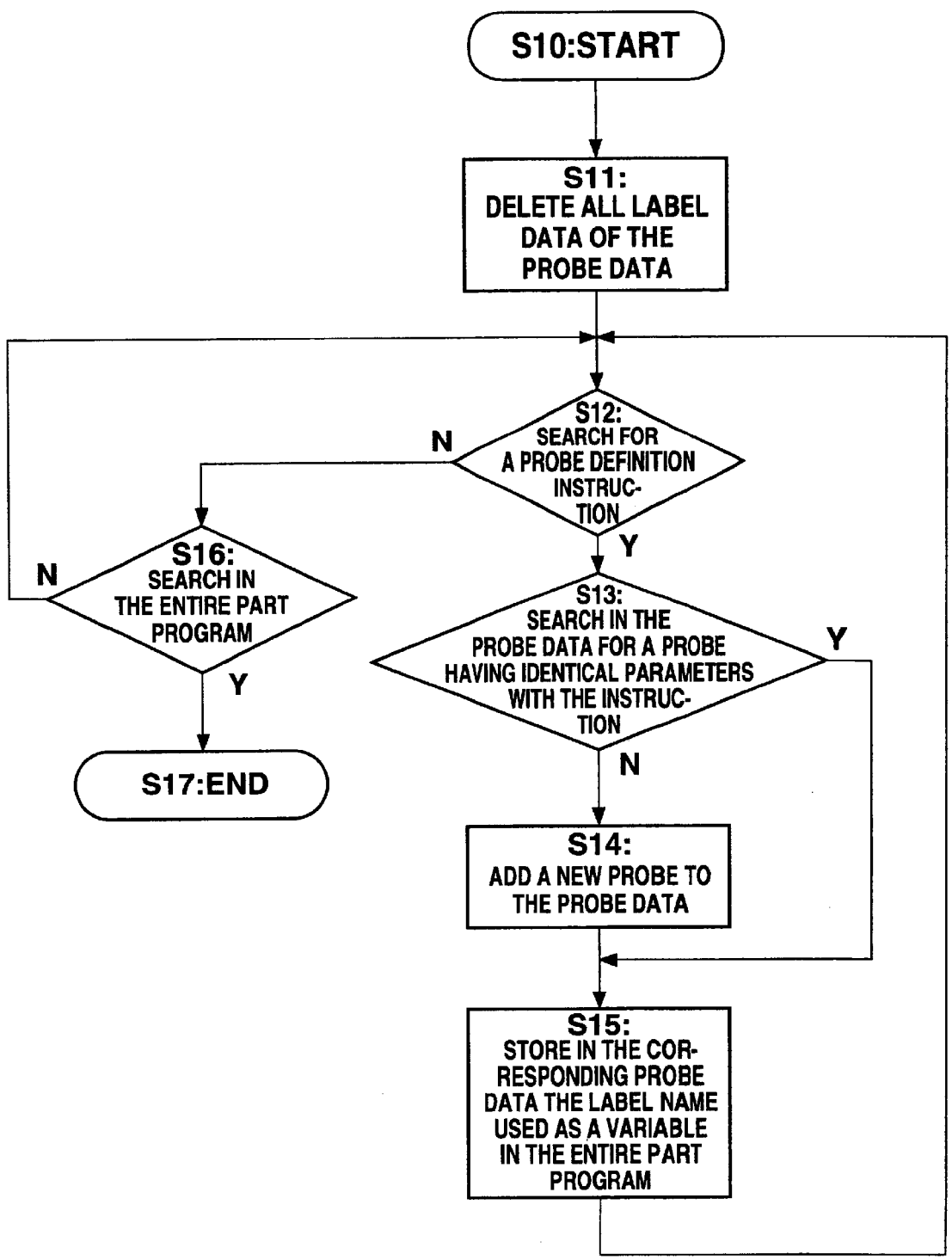
FIG. 12 shows a processing procedure of a probe data extraction unit.

Subsequently, the probe data extraction unit 23 is activated to perform the processing shown in FIG. 12.

The content of the processing is explained below in detail.

S10: The processing of the probe data extraction unit 23 is begun.

S11: Data in the label section of the probe data 20 in the basic condition database 16 are completely deleted.

S12: A probe definition instruction is searched for from the top of the part program. In the example of FIG. 11, No. 34 is found, and it is observed that the probe is a probe with indexing type measuring portion. It is also observed that values such as coordinate values of the contacting portion stated in polar coordinates are defined as parameters.

S13: Based on the probe parameters found in the previous step, a search is made in the probe data 20 within the basic condition database 16 to check whether an identical probe is already registered.

S14: If no record of such a probe is found, a record is added to the probe data 20 to store these parameters.

S15: The probe label name used in the part program ("1" in the example of FIG. 11) is stored in the label section of the probe data. When the probe was already registered, this probe label name is stored in the label section of the corresponding record.

S16: Search is conducted to the end of the part program to repeat the processing in the above manner.

S17: Processing of the probe data extraction unit 23 ends.

12. Description of the Tolerance Data Extraction Unit 24

Figure 13:
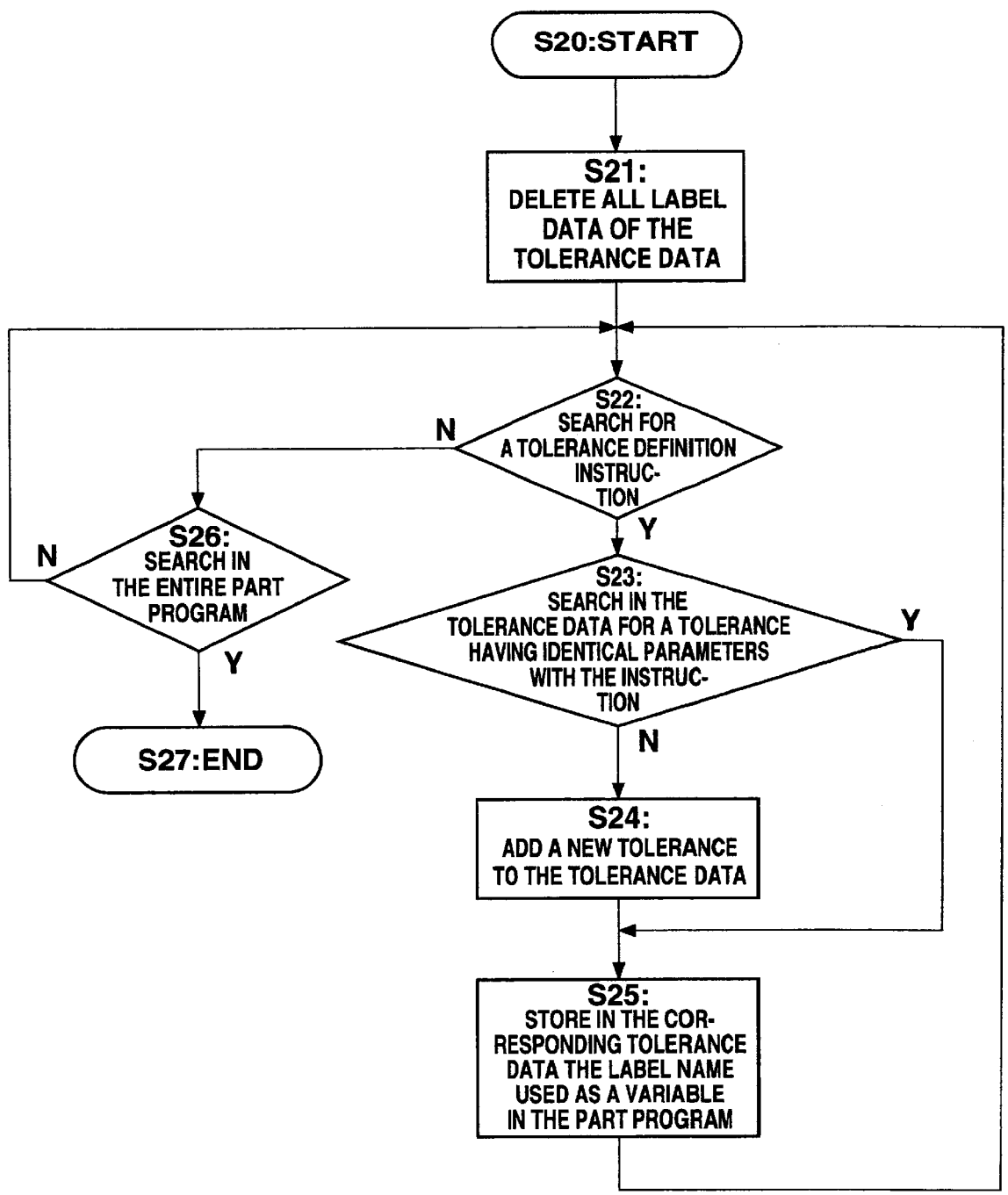
FIG. 13 shows a processing procedure of a tolerance data extraction unit.

Subsequently, the tolerance data extraction unit 24 is activated to perform the processing shown in FIG. 13.

The tolerance data extraction unit 24 performs the following processing.

S20: The processing of the tolerance data extraction unit 24 is started.

S21: Data in the label section of the tolerance data 21 in the basic condition database 16 are completely deleted.

S22: A tolerance definition instruction is searched for from the top of the part program. In the example of FIG. 11, No. 37 is found, and it is observed that the lower limit and the upper limit tolerance values concerning the diameter are defined as the parameters.

S23: Based on the tolerance parameters found in the previous step, a search is made in the tolerance data 21 within the basic condition database 16 to check whether an identical tolerance is already registered.

S24: If no such tolerance is registered, a record is added to the tolerance data 21 to store these parameters.

S25: The tolerance label name used in the part program ("1" in the example of FIG. 11) is stored in the label section of the tolerance data. When the tolerance was already registered, this tolerance label name is stored in the label section of the corresponding record.

S26: Search is conducted to the end of the part program to repeat the processing in the above manner.

S27: Processing of the tolerance data extraction unit 24 ends.

13. Description of the Geometric Model Data Extraction Unit 25

Figure 14:
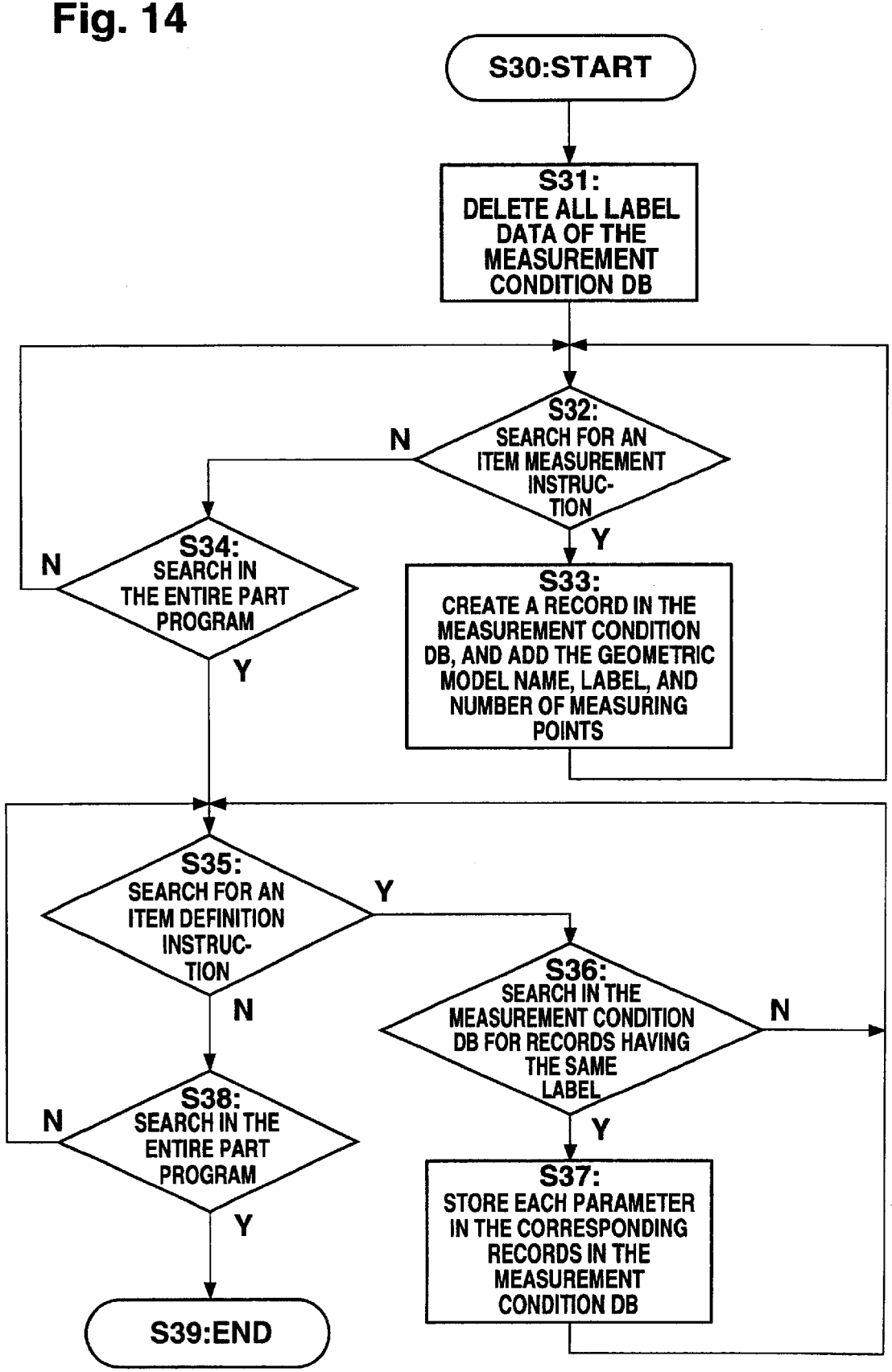
FIG. 14 shows a processing procedure of a geometric model data extraction unit.

Subsequently, the geometric model data extraction unit 25 is activated to perform the processing shown in FIG. 14.

The geometric model data extraction unit 25 performs the following processing.

S30: The processing of the geometric model data extraction unit 25 is started.

S31: Data in the label section of the measurement condition database 17 are completely deleted.

S32: An item measurement instruction is searched for from the top of the part program. When the part program employs macros, special steps must be taken during the search. Specifically, when an argument is employed in a macro, it is necessary to use a value supplied at the time of the macro readout, not the value defined by the macro.

The search must therefore be conducted in the same order that the part program is executed by the three-dimensional measurement device, and arguments must be treated in the same manner. Searches in the description below also follow the same order, unless otherwise indicated. Accordingly, in the example of FIG. 11, the first readout of the circle measurement macro is performed in No. 119 including the argument "1CR". The item measurement instruction of No. 11 is then searched for. It is observed that the parameters in this case are as follows. The geometric model is "circle", the label is "1CR", and the number of measuring points is 4.

S33: A new record is added to the measurement condition database 17, and the above-mentioned parameters are stored in the geometric model section, measuring points section, and the label section.

S34: Search is conducted to the end of the part program to repeat the processing in the above manner.

S35: The search is again conducted from the top of the part program to find an item definition instruction, and parameters defined by that instruction are retrieved. In the example of FIG. 11, No. 10 is found.

S36: The label section of the measurement condition database is searched to find a record having the same label as the label obtained by the search in the previous step.

S37: When such a record is found, the parameters retrieved in step S35 are stored in the respective sections of the record. It is to be noted in FIG. 11 that the diameter of a circle cannot directly be obtained from the instruction of No. 10. The actual measurement point is defined by a variable X. A step is therefore necessary for finding a value to be assigned to variable X. This processing is relatively simple, being possible by searching for an assignment instruction for variable X. In the example of FIG. 11, such an instruction is found in No. 13 and No. 15. No. 15 which is immediately before the point measurement instruction (No. 16) is employed to obtain X=X1+R1. As this measurement point is +R1 with respect to the circle center coordinate X1, R1 indicates the radius. This value is stored in the section for geometric model size of the record.

When the geometric model is complex and the geometric model size cannot be calculated by simple processing, the data may be manually input referring to the workpiece diagram information.

S38: Search is conducted to the end of the part program to repeat the processing in the above manner.

S39: Processing of the geometric model data extraction unit 25 ends.

14. Description of the Speed Data Extraction Unit 26

Figure 15:
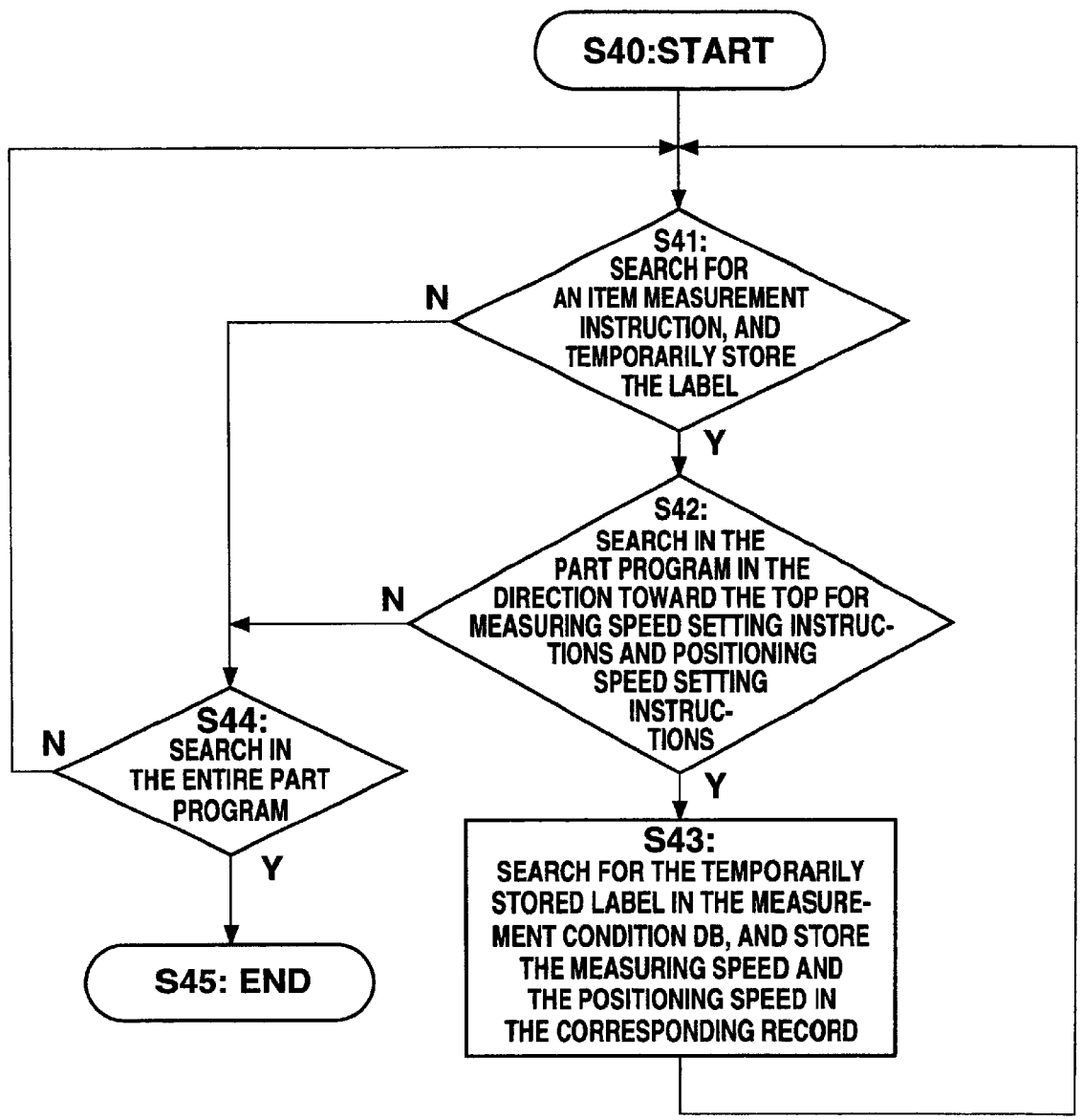
FIG. 15 shows a processing procedure of a speed data extraction unit.

Subsequently, the speed data extraction unit 26 is activated to perform the processing shown in FIG. 15.

The speed data extraction unit 26 executes the following processing.

S40: The processing of the speed data extraction unit 26 is started.

S41: An item measurement instruction is searched for from the top of the part program, and the included label is temporarily stored. In the example of FIG. 11, label "1CR" is found in No. 11.

S42: The part program is then searched in the reverse direction from the item measurement instruction found in the previous step to the top, for a measurement speed setting instruction and a positioning speed setting instruction. In the example of FIG. 11, No. 42 is found as a measurement speed setting instruction, and No. 41 is found as the positioning speed setting instruction.

S43: In the label section of the measurement condition database 17, a record storing a label identical to the label temporarily stored in step S41 is searched for. The measurement speed and the positioning speed found in the previous step are then stored in the measurement speed section and the positioning speed section of the corresponding record.

S44: Search is conducted to the end of the part program to repeat the processing in the above manner.

S45: Processing of the speed data extraction unit 26 ends.

15. Description of the Database Producing Means 15

Figure 16A:
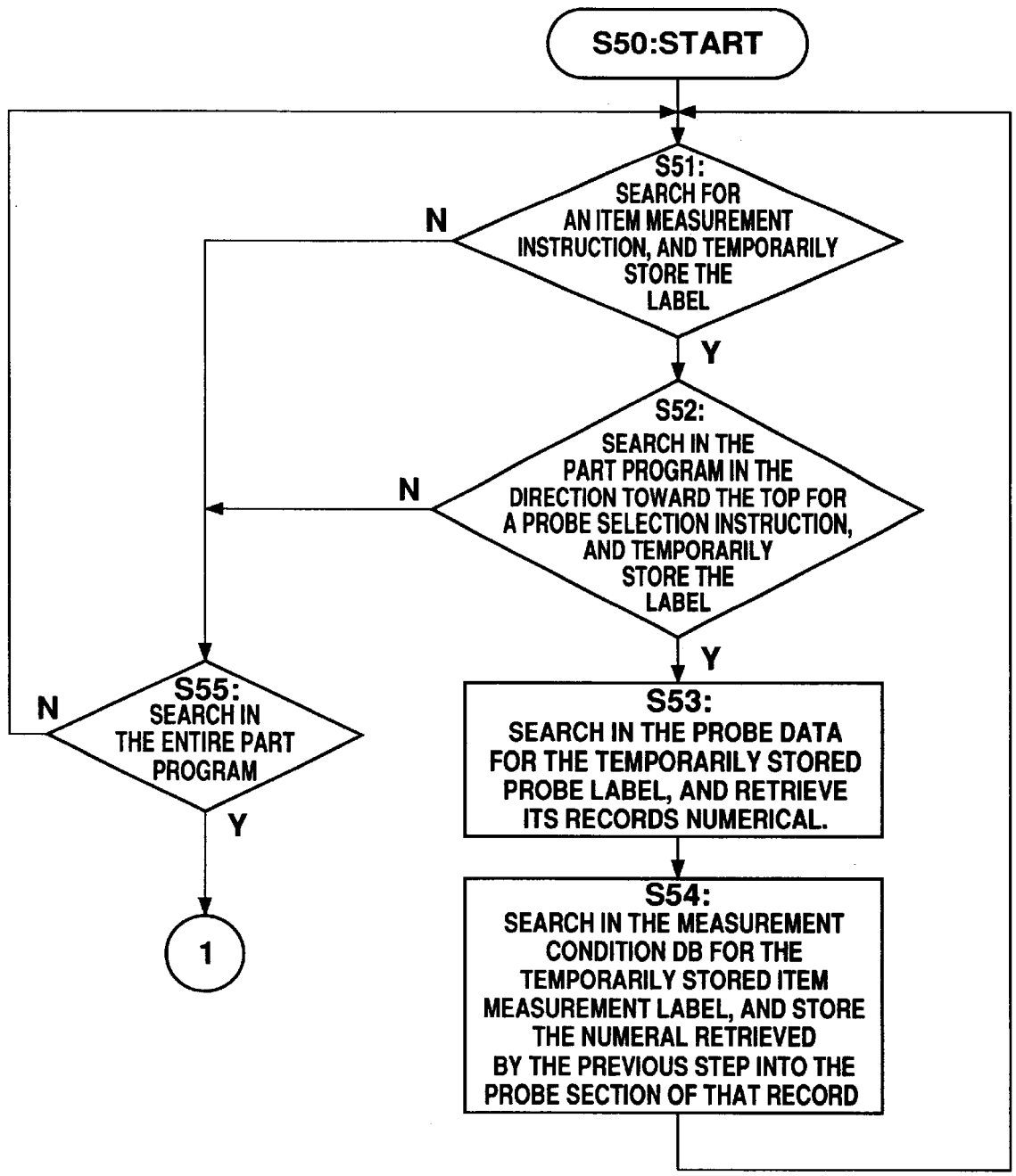
FIGS. 16A and 16B show a processing procedure in a database producing means.
Figure 16B:
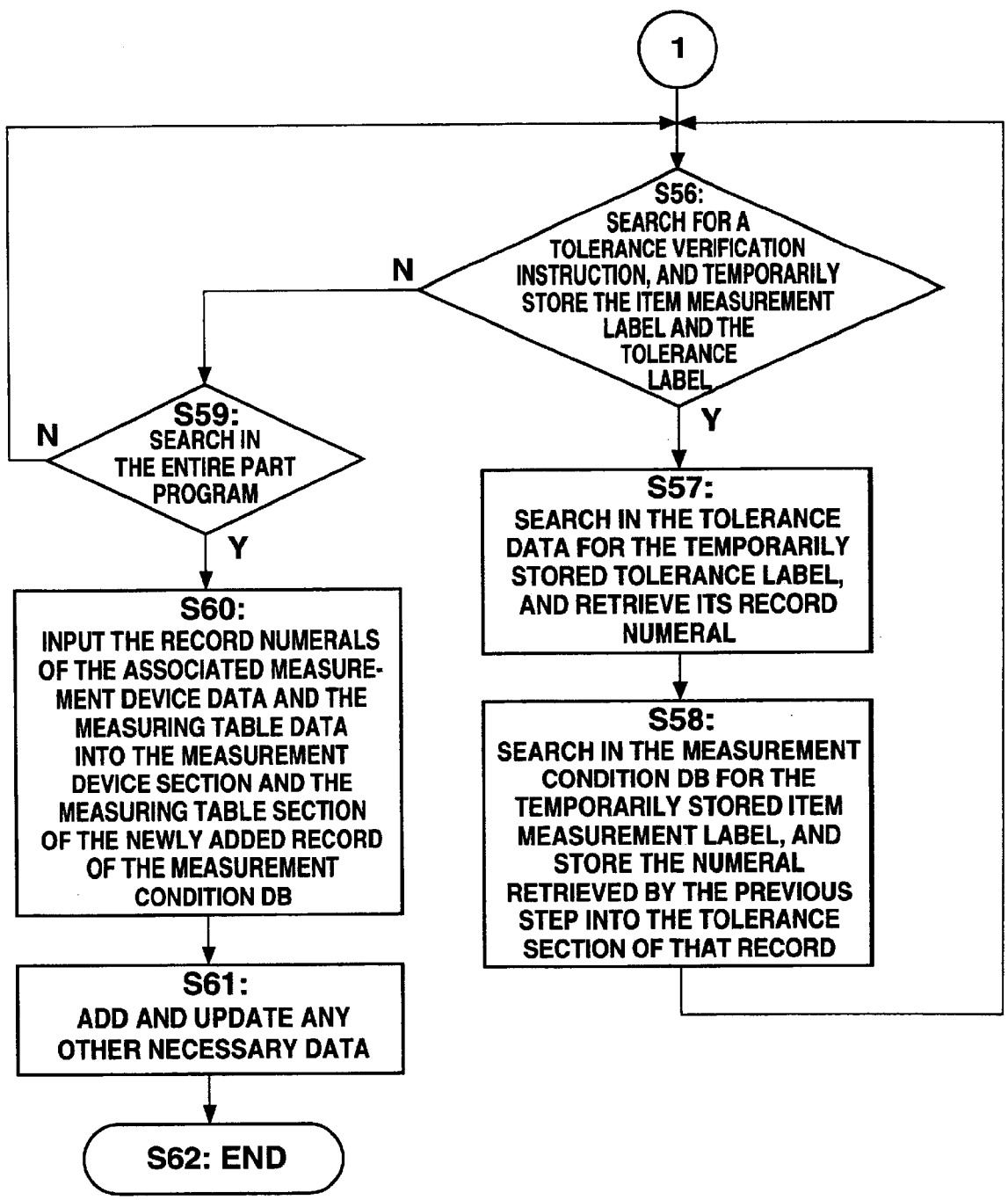

Subsequently, the database producing means 15 is activated to perform the processing shown in FIGS. 16A and 16B.

The database producing means 15 performs link processing of the basic condition database 16 and the measurement condition database 17. Specifically, the following processing is executed.

S50: The database producing processing is started.

S51: An item measurement instruction is searched for from the top of the part program, and the included label is temporarily stored. In the example of FIG. 11, label "1CR" is found in No. 119.

S52: The part program is then searched in the reverse direction from the item measurement instruction found in the previous step to the top for a probe selection instruction, and the probe selection label is temporarily stored. In the example of FIG. 11, No. 35 is found, and it is observed that the probe selection label is "1".

S53: The label section of the probe data 20 within the basic condition database 16 is searched to find a record storing a label identical to the label temporarily stored in the previous step. The numeral of the corresponding record is then retrieved. In the example of FIG. 6, the numeral is p1.

S54: The label section of the measurement condition database 17 is searched to find a record matching the label temporarily stored in S51. In the probe section of the corresponding record, the numeral of the probe data 20 retrieved in the previous step is stored.

S55: Search is conducted to the end of the part program to repeat the processing in the above manner.

S56: A tolerance verification instruction is searched for from the top of the part program, and the included labels are temporarily stored. In the example of FIG. 11, item measurement labels "1CR", "2CR", "3CR", and "4CR", and a tolerance label "1" are found in No. 138.

S57: The label section of the tolerance data 21 within the basic condition database 16 is searched to find a record storing a label identical to the tolerance label temporarily stored in the previous step. The numeral of the corresponding record is then retrieved. In the example of FIG. 7, the numeral is t1.

S58: The label section of the measurement condition database 17 is searched to find a record matching the item measurement labels temporarily stored in S56. In the tolerance section of the corresponding record, the numeral of the tolerance data 21 retrieved in the previous step is stored.

S59: Search is conducted to the end of the part program to repeat the processing in the above manner.

S60: The measurement device and the measuring table used for performing measurement using the part program are selected from the measurement device data 18 and the measuring table data 19 within the basic condition database 16. The record numerals of the respective device and table are input to the measurement device section and the measuring table section of the newly added record of the measurement condition database 17. This data may be manually input. Alternatively, instructions for recognizing those device and table may be included in the part program to allow for automatic input.

S61: Data which could not be input by the above procedure may be manually input, not for all cases but only when necessary, while referring to the workpiece diagram information and the measurement operation instruction information. In the example of FIG. 10, surface roughness is designated for the slot portion. Such information that cannot be extracted by the part program can be compensated via manual operation. In this case, a roughness section must be provided in the measurement condition database.

S62: Database producing processing ends.

16. Description of a Relational Database

The measurement information database 13 created using the basic condition database 16 and the measurement condition database 17 is completed in the above-described manner. In this example, data such as the probe data 20 and the tolerance data 21 in the basic condition database 16 are configured with records of the contents which do not coincide. The data of the measurement condition database 17, on the other hand, are not actual data. The measurement condition database 17 only retains the numerals of the data. This allows storage capacity to be reduced and eliminates the need to repetitively input the same data for each measurement condition, thereby facilitating database processing. In other words, the measurement condition database 17 of this example is configured as a relational database.

17. Use of the Measurement Information Database

The method of use of this measurement information database 13 for part program creation is next explained.

17.1 Conventional Problems in Part Program Creation

Problems in conventional part program creation are first described.

When creating a part program, various necessary measurement conditions are designed by referring to the workpiece diagram information and the measurement operation instruction information, and by determining the geometric model of the measuring location. Example parameters which must be considered for each item of measurement condition design include the following:

1. Determination of the geometric model: shape of the measuring location.
2. Determination of the measurement device: measuring range, measurement accuracy, measuring time, etc.
3. Determination of the measuring table: measuring range, measurement accuracy, measuring time, measurement method, etc.
4. Determination of the probe: whether measurable or not, measurement accuracy, etc.
5. Determination of the measuring location: shape of the measuring location, use of the workpiece, etc.
6. Determination of tolerance: the material, machining method, surface roughness, and use of the workpiece, etc.
7. Determination of the number of measuring points: size of the geometric model, tolerance, surface roughness, etc.
8. Determination of the measurement path: size of the geometric model, number of measuring points, measuring time, type of the measurement device, type of the measuring table, etc.
9. Determination of the measuring speed: measuring time, measurement accuracy, type of the probe, etc.

The parameters of respective measurement conditions interrelate, and the combination of the conditions influences the measurement accuracy and efficiency. In addition, there are an unlimited number of possible combinations. Know-how is therefore required when designing measurement conditions.

When measuring roundness, for example, a question arises regarding how many points should be used to measure the circle. The number of measuring points is decided considering the circle diameter, tolerance value of the roundness, and, depending on the case, the material and machining method of the workpiece. Although there is no generalized calculation formula, experience shows that it is preferable to increase the number of measuring points when the circle diameter is larger, when the tolerance value of the roundness is smaller, or when the surface roughness of the workpiece is greater.

Further, operation time for each measurement may be restricted, and there may exist a question concerning how the measuring speed should be controlled. Although it is conceivable to increase the measuring speed in measuring locations where large tolerance value and low accuracy are allowed, determination of the suitable amount by which to increase speed is made depending on experience because the degree of measurement accuracy degradation due to an increase of measuring speed alters in a complex manner based on the type of probe, positioning speed, measurement approach distance, and other factors.

17.2 Use of the Measurement Information Database 13 in the Present Invention The measurement information database 13 is useful when measurement know-how is required in creating a part program for coordinate and surface texture measurement.

Figure 17:
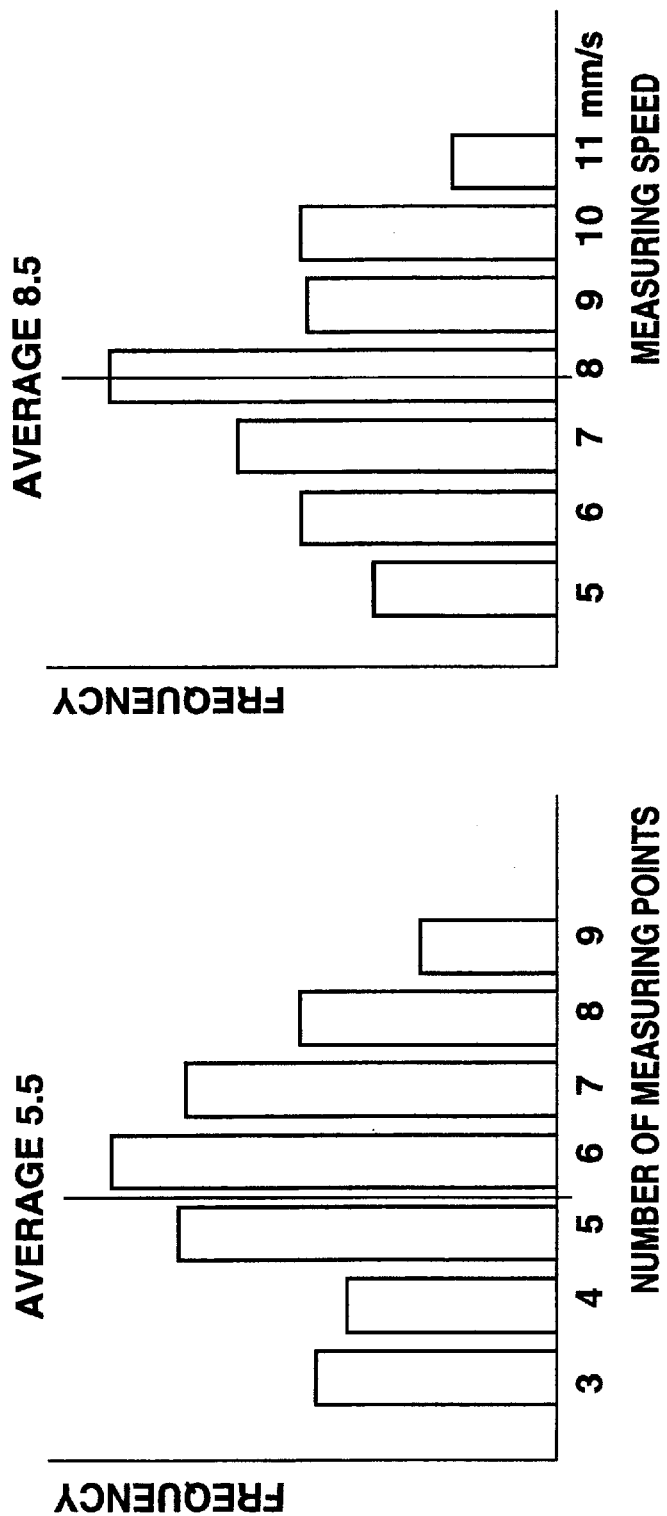
FIG. 17 shows an example display of results obtained by a statistical processing of a database.

For example, designations may be made concerning the measurement device, measuring table, probe, tolerance, geometric model, measuring region, geometric model orientation, and size range of geometric model. Records that match the designated conditions can then be extracted from the measurement condition database 17. A particular statistical processing is then performed on the respective data concerning the number of measuring points, the measuring speed, and the positioning speed of the extracted records. For example, an average may be calculated, and the frequency distribution displayed. Example display results for the measuring point number and the measuring speed are shown in FIG. 17. From the results in this state, it is not clear whether or not the measuring point number distribution and the measuring speed distribution match. Re-extraction is therefore performed on the extracted records by further restricting the measuring point number (in the example of FIG. 17, the measuring point number from 4 to 7). Similarly as before, the particular statistical processing is performed on the respective data concerning the measuring speed and the positioning speed by calculating the averages and displaying the frequency distribution, for example. From these results, it is possible to obtain the measurement condition design values, namely, the measuring point number, the measuring speed, the positioning speed, and other condition values, that were most frequently used in past measurements under particular measurement conditions including measurement device and probe.

Moreover, by adopting statistically processed results such as average values as the measurement conditions, it is possible to perform automatic determination of measurement conditions. Such automatic determination may be performed by deciding the measuring point number based on the average measuring point number, then further restricting the records using the decided measuring point number, using the restricted records to perform averaging processing concerning measuring speed to decide the measuring speed, and further deciding the positioning speed in a similar manner.

Furthermore, in contrast to the above, information, such as to which probe is usable, can be extracted from the measurement information database 13 upon designating conditions such as geometric model size and tolerance.

By performing a predetermined extraction processing with respect to the measurement information database 13 and by performing a suitable statistical processing on the extracted results, accumulated useful know-how can be utilized. By using such information when creating a part program, an appropriate part program can be produced, even by an inexperienced or unskilled operator.

What is claimed is:

1. A part program analysis apparatus for creation of a new part program used in coordinate and surface texture measurement in which measurement control is performed by the new part program, comprising:

a measurement method analyzing means for analyzing a practiced measurement part program to extract measurement information including a measurement condition; and a storing means for rewritably storing said measurement condition, wherein the stored measurement condition is accumulated and statistically correlated to create the new part program.

2. A part program analysis apparatus for creation of a new part program used in coordinate and surface texture measurement in which measurement control is performed by the new part program, comprising:

a measurement method analyzing means for analyzing a practiced measurement part program to extract measurement information including a measurement condition for each item measurement; and a storing means for rewritably storing said measurement condition corresponding to each item measurement, wherein the stored measurement condition is accumulated and statistically correlated to create the new part program.

3. A part program analysis apparatus for creation of a new part program used in coordinate and surface texture measurement in which measurement control is performed by the new part program, comprising:

a measurement method analyzing means for receiving an input of a practiced measurement part program and workpiece machining information data, and for analyzing said practiced measurement part program to extract measurement information including a measurement condition for each item measurement;

a database producing means for converting said measurement information including a measurement condition extracted for each item measurement into a database for creating a part program; and a database for creating a part program, which rewritably stores said measurement condition corresponding to each item measurement, wherein the new part program is created based on the database, and wherein data of said database is analyzed to automatically determine a measurement condition, thereby the new part program is created.

4. The part program analysis apparatus used in coordinate and surface texture measurement defined in claim 3, wherein said database is a relational database.

5. The apparatus for creating a part program used in coordinate and surface texture measurement defined in claim 3, wherein data of said database is analyzed for use in determining a measurement condition, and a result of the analysis is displayed or output.

6. A part program analysis method for creation of a new part program used in coordinate and surface texture measurement in which measurement control is performed by the new part program, comprising:

a measurement method analyzing step of analyzing a practiced measurement part program to extract measurement information including a measurement condition; and a storing step of rewritably storing said measurement condition, wherein the stored measurement condition is accumulated and statistically correlated to create the new part program.

7. A part program analysis method for creation of a new part program used in coordinate and surface texture measurement in which measurement control is performed by the new part program, comprising:

a measurement method analyzing step of analyzing a practiced measurement part program to extract measurement information including a measurement condition for each item measurement; and a storing step of rewritably storing said measurement condition corresponding to each item measurement, wherein the stored measurement condition is accumulated and statistically correlated to create the new part program.

8. A part program analysis method for creation of a new part program used in coordinate and surface texture measurement in which measurement control is performed by the new part program, comprising:

a measurement method analyzing step of receiving an input of a practiced measurement part program and workpiece machining information data and analyzing said practiced measurement part program to extract measurement information including a measurement condition for each item measurement; and a database producing step of converting said measurement information including a measurement condition extracted for each item measurement into a database for creating a part program, wherein the new part program is created based on the database, and wherein data of said database is analyzed to automatically determine a measurement condition, thereby the new part program is created.

9. The part program analysis method used in coordinate and surface texture measurement defined in claim 10, wherein said database is a relational database.

10. The part program creation method used in coordinate and surface texture measurement defined in claim 10, further comprising the steps of:

analyzing data of said database for use in determining of a measurement condition; and displaying or outputting a result of the analysis.

11. The part program analysis apparatus of claim 1, further comprising a medium storing a program for allowing a computer to execute a measurement method analyzing procedure for analyzing a practiced measurement part program to extract measurement information including a measurement condition; and a storing procedure for rewritably storing said measurement condition.

12. The part program analysis apparatus of claim 3, further comprising a medium storing a program for allowing a computer to execute a procedure for analyzing a measurement information database; and a part program creating procedure.

13. The part program analysis apparatus used in coordinate and surface texture measurement defined in claim 3, wherein data of said database is accumulated and statistically correlated to automatically determine a measurement condition.

14. The part program creation method used in coordinate and surface texture measurement defined in claim 8, wherein data of said database is accumulated and statistically correlated to automatically determine a measurement condition.

* * * * *